US008621359B2

(12) United States Patent
Cao et al.

(10) Patent No.: US 8,621,359 B2
(45) Date of Patent: Dec. 31, 2013

(54) METHOD AND APPARATUS FOR GENERATING 3D CAROUSEL TREE DATA VISUALIZATION AND RELATED DEVICE

(75) Inventors: Nan Cao, ShannXi Province (CN); Shi Xia Liu, Beijing (CN); Hui Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 856 days.

(21) Appl. No.: 12/109,530

(22) Filed: Apr. 25, 2008

(65) Prior Publication Data

US 2008/0295037 A1   Nov. 27, 2008

(30) Foreign Application Priority Data

Apr. 28, 2007   (CN) .......................... 2007 1 0107720

(51) Int. Cl.
*G06F 15/177*   (2006.01)
(52) U.S. Cl.
USPC ........................................................ 715/734
(58) Field of Classification Search
USPC ........................................................ 715/734
See application file for complete search history.

(56) References Cited

U.S. PATENT DOCUMENTS

| | | | |
|---|---|---|---|
| 5,786,820 A * | 7/1998 | Robertson ..................... | 715/853 |
| 2005/0229102 A1 | 10/2005 | Watson et al. | |
| 2006/0004873 A1 | 1/2006 | Wong et al. | |
| 2006/0048076 A1 * | 3/2006 | Vronay et al. ................ | 715/850 |
| 2006/0129569 A1 * | 6/2006 | Dieberger et al. ............ | 707/100 |
| 2010/0241346 A1 * | 9/2010 | Waris ............................ | 701/201 |

FOREIGN PATENT DOCUMENTS

| | | |
|---|---|---|
| EP | 0694878 | 1/1996 |
| EP | 0435601 | 11/2001 |

OTHER PUBLICATIONS

Card Stuart K., MacKinlay Jock D., Robertson George G.; Cone Trees: Animated 3D Visualizations of Hierarchical Information; Xerox Palo Alto Research Center, CA, USA.
Hierachical Carousel Viewer; http://channel9.msdn.com/wiki/3dcarouselcontrol/.
Card K., MacKinlay J. D., Robertson G. G.; Information Visualization Using 3D Interactive Animation; Source: Computer Graphic Forum,v12,n3, 1993 (see last page for citation).
Marcin Poturalsdki, David Vronay, Shuo Wang; Designing a Generalized 3D Carousel View; CHI pp. 2017-2020, 2005.
Akiyo N., Hiroyuki D., Katsumi T; WebCarousel: Automatic Presentation and Semantic Restructuring of Web Search Result for Mobile Environments(Lecture Notes in Com Sci vol. 2113.

* cited by examiner

*Primary Examiner* — Boris Pesin
*Assistant Examiner* — Angie Badawi
(74) *Attorney, Agent, or Firm* — Cantor Colburn LLP; Vazken Alexanian

(57) ABSTRACT

A method for generating 3D carousel visualization of large-scale tree data, which comprises the steps of: receiving a user's selection of a node in the carousel; according to the radius of a sub-carousel corresponding to the user-selected node and the radius of a carousel at which the selected node is located, judging whether or not the sub-carousel can be expanded at the carousel at which the selected node is located; expanding the sub-carousel at the carousel at which the selected node is located, if it is determined that the sub-carousel can be expanded at the carousel at which the selected node is located. A device capable of implementing the method is provided. The number of carousel levels visualized on a visualization device can be adjusted dynamically, and the visualization of a focus becomes more prominent, and relationships between nodes at each level of the tree data visualization get more apparent.

19 Claims, 12 Drawing Sheets

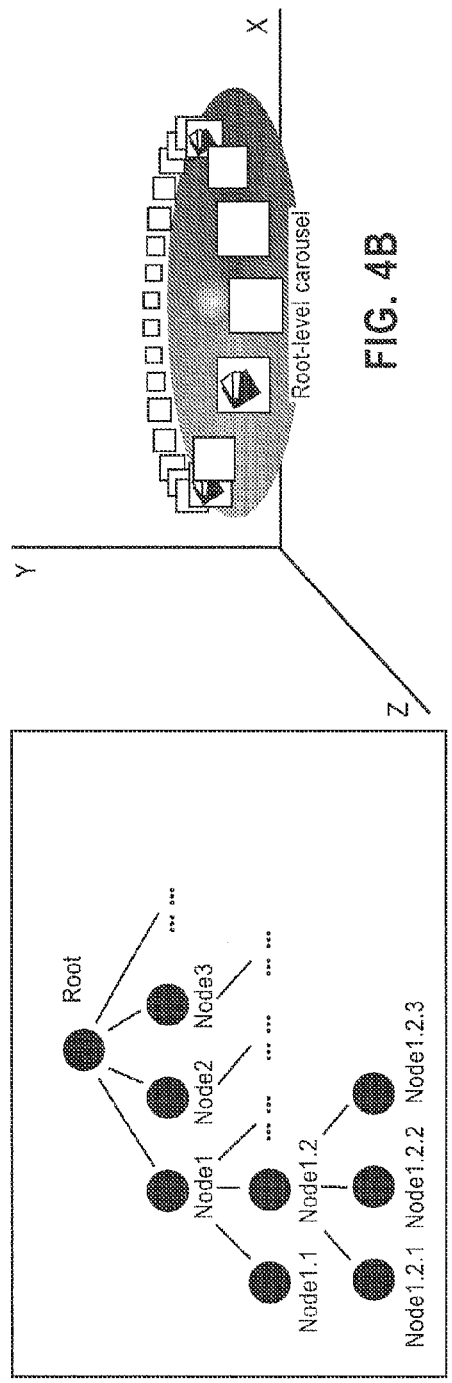
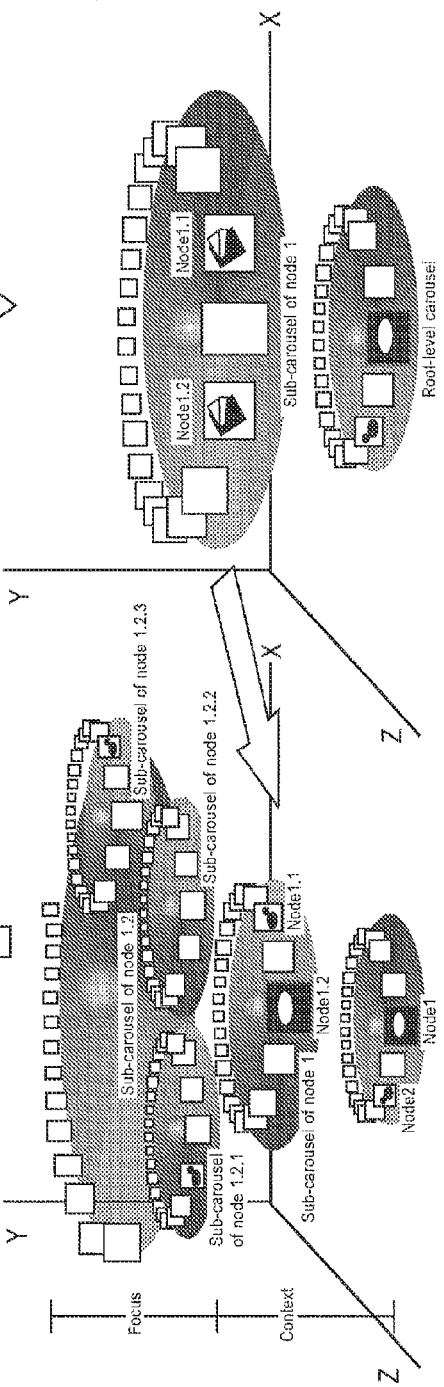
FIG. 4A
FIG. 4B
FIG. 4C
FIG. 4D

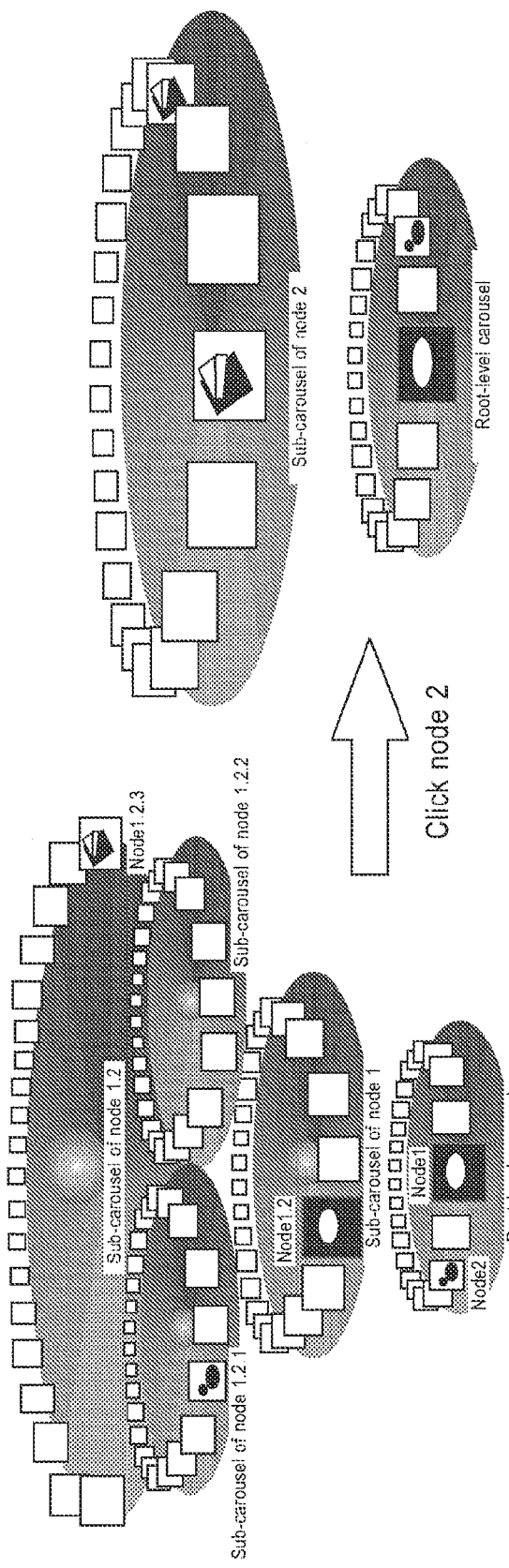

METHOD AND APPARATUS FOR GENERATING 3D CAROUSEL TREE DATA VISUALIZATION AND RELATED DEVICE

CROSS-REFERENCE

This application claims priority under 35 U.S.C. §119 from Chinese Patent Application No. 2007-10107720.8 filed Apr. 28, 2007, the entire contents of which are incorporated herein by reference.

FIELD OF THE INVENTION

The present invention relates to tree data visualization, and more particularly to a method for generating 3D carousel tree data visualization and a related device.

BACKGROUND OF THE INVENTION

A 3D carousel data visualization is inspired by a table with a rotatable carousel in our daily life. By rotating the carousel on the table as shown in FIG. 1, all dishes laid on the table will be presented before diners. Like to this, the 3D carousel data visualization presents a plurality of data nodes (such as files, folders, etc.) on a 3D carousel, and a user can select nodes of interest one by one through rotating the carousel. Such a man-machine interface is not only a straight, inviting and aesthetical layout, which facilitates the understanding of users, but also focuses the front position to be larger and more eye-catching than focuses in the rear due to the utilization of 3D visual experience. It arouses more users' attention. Additionally, such animated rotation provides an interesting use experience for users because of added interactions with users.

Currently, applications of such 3D carousel data visualization and variations of the visualization of tree data structures are prevalent in the field of computer applications. For example, the paper entitled "Designing a Generalized 3D Carousel View," under the subtitle Late Breaking Results: Short Papers and published by Shuo Wang et al. in 2005, pages 2017-2020 discloses a method of carousel data visualization. In this method, each file is shown around the outline of the carousel as an icon. When a user drags the carousel, finds a focus file, and clicks an icon corresponding to the file, the carousel will be smoothly rotated to the target the user desires, i.e. the focus is found. In this manner, users can easily select a file. FIG. 2 shows a prototype of carousel visualization obtained using the aforesaid method of data visualization. The "Termination Marker" is to determine a market point during rotation and thereby make a user aware of whether the carousel has been rotated for a whole round, i.e. to mark that the user has searched all over from this node (icon). In the "Clipping Area" are placed other icons that cannot be visualized completely. The numeral 36 denotes that in the "Clipping Area" are placed the icons of 36 files. The carousel generated according to the method of "focus+context effect" as described in the paper is clearly shown in FIG. 2. The front icons are larger than the icons in the back, which is a natural result generated by applying 3D visual experience to the carousel visualization.

The visualization method described in the paper and many other applications of 3D carousel visualization, such as computer games, media explorers have testified that 3D carousel visualization is very suitable for presenting icons, pictures or any other items that can be represented by images. However, it is not a good choice to visualize an item list with long text strings with 3D carousel visualization.

The 3D carousel visualization method is also adopted by a variety of well-known visualization method, such as a method of layout out 3D hierarchical structures and a corresponding interaction manner, described by Robertson G. McKinley J D, et al. in the paper "Cone Trees: Animated 3D Visualizations of Hierarchical Information" published in Proceedings of the ACM Human Factors in Computing Systems (CHI'91), 1991. It is clear from this paper, with respect to a limited visualization interface such as a display screen of a certain size, and when there is a relatively large number of nodes, the respective node of a cone tree will be superposed with one other so that data information cannot be presented effectively. Accordingly, the cone-tree visualization method is not suitable to a solution with a large data set. The EP 0435601 B1 also discloses a visualization method of presenting hierarchical structures in a 3D space in the manner of nodes and links. In this method, all nodes are laid out in a 3D space at a time. Like the cone-tree visualization method, in the case that where there is a relatively large number of nodes, respective nodes will be superposed one another. Additionally, in these two visualization methods, upon the receipt of an instruction indicating that the user has selected a node of interest, the selected node will become the current focus through rotation, while each branch in the previously-visualized tree structure will be kept. Hence, all branches in the previously-visualized tree structure also will be kept even if they have little relevance to the currently-selected focus. Then since the number of such branches grows and nodes involved increase, focuses will be pushed to a side for visualization, so the utility of the visualization interface is reduced dramatically.

EP 0694878A2 also discloses a method of incrementally laying out a tree structure on a plane. In this method, nodes of each hierarchy in the tree structure are statically laid out on a plane, and the focus of a view cannot be changed or highlighted. As a result, it is difficult for uses to learn about the context of the focus in the miscellaneous overall layout. This method also contains the above-mentioned problems, such as node superposition and low utility of the visualization interface.

Although 3D carousel user interfaces are employed by more and more application as described previously, none of the above applications can efficiently handle the visualization of hierarchically-structured data of a huge amount. Nor could it propose any optimizations to the interaction mechanism of the visualization of a 3D hierarchical structure. Therefore, there is a need for a visualization method and device capable of highlighting focuses of interest to users in a tree hierarchical data and utilizing a visualized interface more efficiently.

SUMMARY OF THE INVENTION

It is an objective of the present invention to provide a visualization method capable of overcoming deficiencies in the reference methods for tree data visualization and a device implementing the same. The present invention comprises a method for generating 3D carousel tree data visualization, the steps of, receiving a user's selection of a node in the carousel according to the radius of a sub-carousel corresponding to the user-selected node and the radius of a carousel at which the selected node is located, judging whether or not the sub-carousel can be expanded at the carousel at which the selected node is located; expanding the sub-carousel at the carousel at which the selected node is located, if it is determined that the sub-carousel can be expanded at the carousel at which the selected node is located.

According to another embodiment of the present invention, a method is provided for generating 3D carousel tree data visualization, wherein the tree data is visualized in the form of multiple levels of 3D carousels. The method comprises the steps of: setting the total number of visible levels, which is the maximum number of carousel levels that can be visualized in a region where the multiple levels of the 3D carousels are visualized; receiving a user's selection of a node in the carousels; keeping a carousel at which the node is located and a lower-level carousel thereof, and collapsing other carousels; and expanding a sub-carousel corresponding to the user-selected node where a top-level carousel is the carousel in which the sub-carousel is expanded and the total number of the carousels does not exceed the total number of the visible levels.

The tree data visualization in the form of a 3D carousel obtained using the previously presented method can utilize the visualization region more effectively, highlight the context of the user-selected node, and make the tree data visualization in the form of a 3D carousel more apparent.

To implement the previously presented method of the present invention, a device for generating 3D carousel tree data visualization, which is for visualizing the tree data in the form of multiple levels of 3D carousels is provided. The device comprises: a for receiving a user's selection of a node in a carousel; a means for judging, according to the radius of a sub-carousel corresponding to the user-selected node and the radius of a carousel at which the selected node is located, whether or not the sub-carousel can be expanded at the carousel at which the selected node is located; and a means for co-leveling; and a means for expanding the sub-carousel at the carousel at which the selected node is located, if it is determined that the sub-carousel can be expanded at the carousel at which the selected node is located.

According to another embodiment of the present invention, a device for is provided for generating 3D carousel tree data visualization, which is for visualizing the tree data in the form of multiple levels of 3D carousels. The device comprises: a means for setting the total number of visible levels, which is the maximum number of carousel levels that can be visualized in a region where the multiple levels of the 3D carousels are visualized; a means for receiving a user's selection of a node in the carousels; a means for current level changing keeping a carousel at which the node is located and a lower-level carousel thereof and collapsing other carousels; and a means for expanding a sub-carousel corresponding to the user-selected node where a top-level carousel is the carousel in which the sub-carousel is expanded and the total number of the carousels does not exceed the total number of the visible levels.

Another embodiment of the present invention provides a computer program product that includes programming instructions for implementing steps of the method according to the present invention. The computer program product and related programming steps are contained on computer readable media and are implemented by a computer system, network or related technology With the methods and devices according to the present invention where the total number of visible levels can be set arbitrarily in accordance as needs, and the number of carousel levels visualized on a visualization device can be adjusted dynamically, and the visualization of a focus becomes more prominent. Additionally, relationships between nodes at each level of the tree data visualization get more apparent. In particular, in case of a large amount of tree data, the superposition of nodes in the tree data visualization in the prior art can be avoided effectively by reducing the total number of visible levels, and problems existing in the prior art are overcome accordingly.

BRIEF DESCRIPTION ON THE DRAWINGS

FIGS. 4a-4d show an example of a prototype of multi-level carousel visualization of tree data generated in the flow of the method shown in FIG. 3.

FIGS. 5a-5b show a schematic view of processing where a user selects a node that is not at the current level when the multiple levels of carousels are visualized in the flow of the method shown in FIG. 3.

Figure 16:
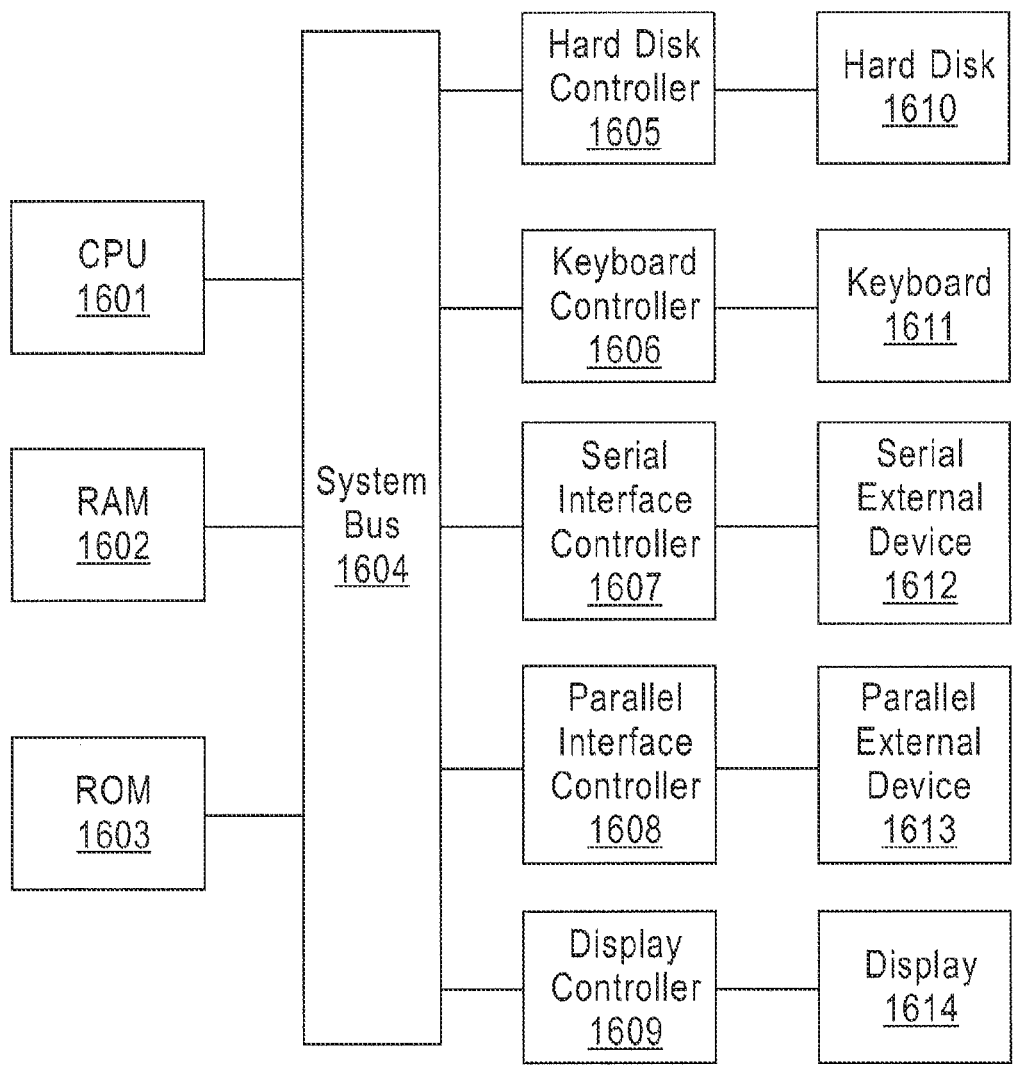

FIG. 16 schematically shows a computer system in which the method of the present invention can be implemented.

DESCRIPTION OF THE PREFERRED EMBODIMENTS

Embodiments of the present invention will be illustrated in detail with reference to the accompanying drawings.

A method for generating tree data visualization according to an embodiment of the present invention has made improvement to the visualization of tree data on the basis of carousel data visualization in the prior art. A flowchart of the method of generating tree data visualization is shown in FIG. 3.

Figure 1:
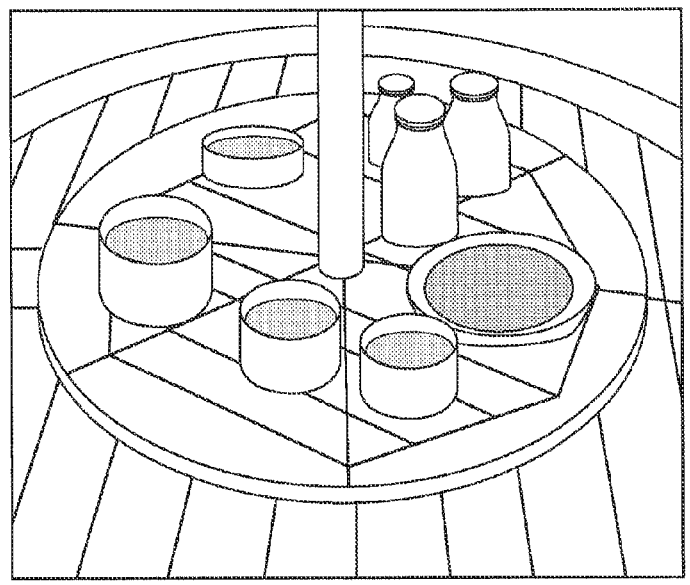
FIG. 1 shows an example of a table having a rotatable carousel in daily life.
Figure 2:
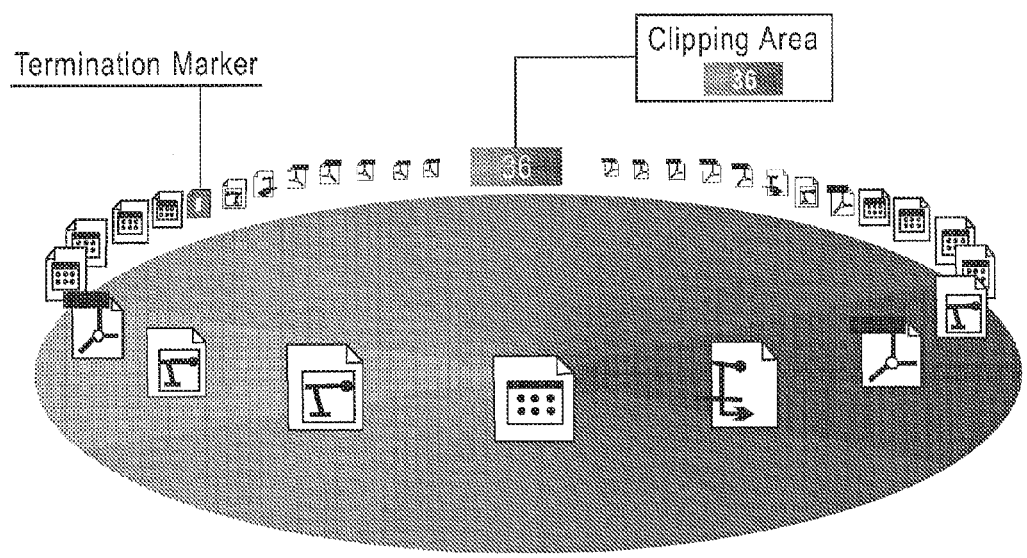
FIG. 2 shows an example of a prototype of 3D carousel visualization obtained from a data visualization method in the prior art.
Figure 3:
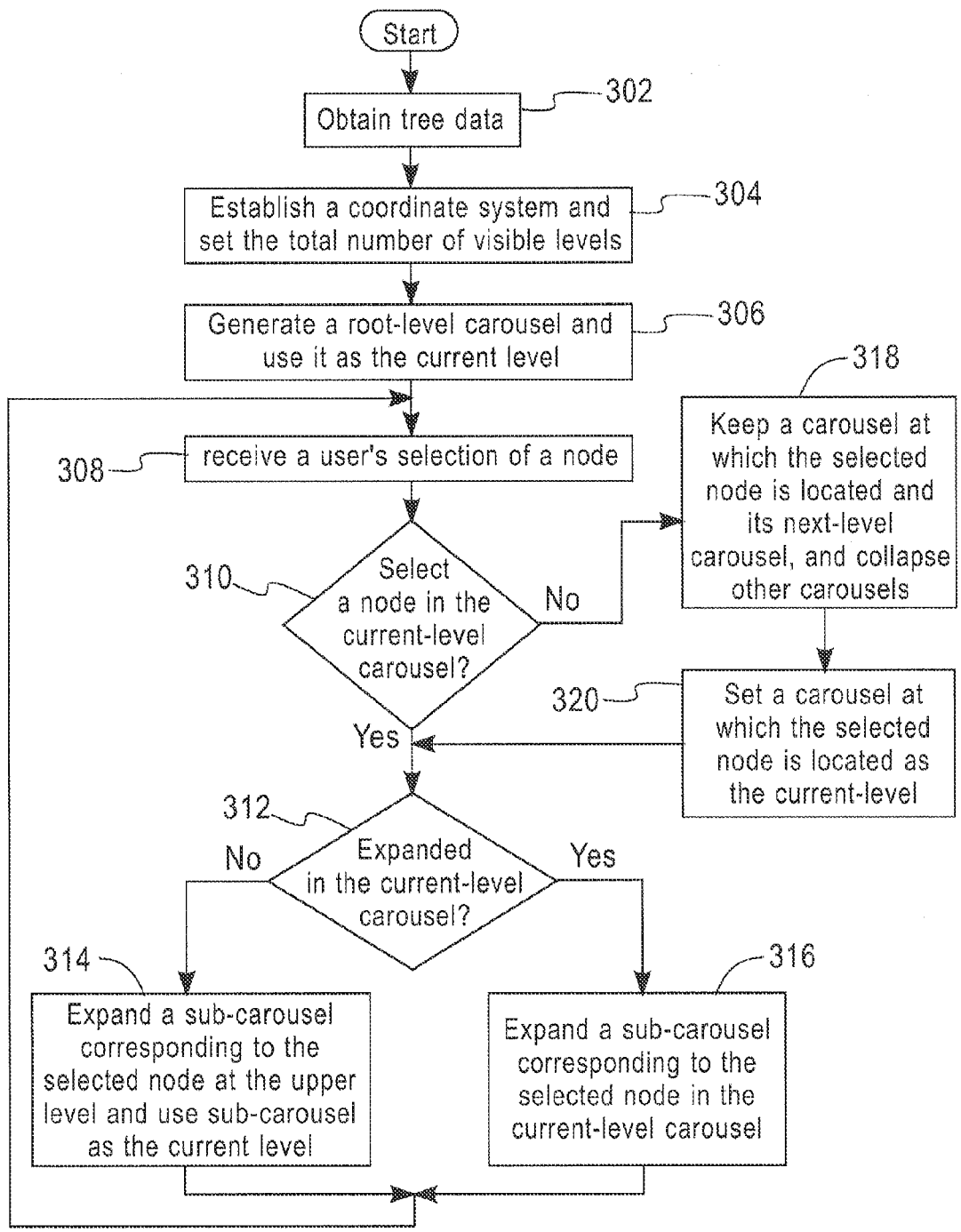
FIG. 3 shows a flowchart of a method for generating tree data visualization according to an embodiment of the present invention.

After the flow shown in FIG. 3 starts, tree data to be visualized is obtained in step 302. The tree data can be generated by a device that is capable of implementing the method according to an embodiment of the present invention. The tree data can alternatively be received from other devices via, for example, direct connection or transmission of a communication network.

Afterwards, the flow shown in FIG. 3 establishes a 3D coordinate system in a visualization region and sets the total number $\lambda$ of visible levels in the visualization region according to the concrete situation of a visualization device in step 304. Here, the 3D coordinate system is used for clearly visualizing carousels receiving nodes at each level in the 3D visual form. The total number $\lambda$ of visible levels denotes the total number of carousel levels in which the visualization region may visualize at maximum. A user can establish an appropriate 3D coordinate system and total number of visible levels according to conditions (such as resolution and so on) of the visualization device in conjunction with a persons own needs.

It should be understood that various methods for establishing a 3D coordinate system in the prior art can be employed, and a variety of 3D coordinate systems (including different orientation setting of the coordinate system) can be employed, so long as carousels receiving nodes at each level can be clearly visualized in the 3D visual form. Also, the user can set the total number $\lambda$ of visible levels out of different considerations. For example, some user may pay more attention to nodes serving as focuses, and then the user can set the total number $\lambda$ of visible levels to be relatively small. For example $\lambda$ can equal to 3 or even 1. Some user might hope to give consideration to both a focus and the context thereof, and then the user can set the total number $\lambda$ of visible levels to be relatively large, for example, equal to 5, so long as the total number $\lambda$ of visible levels does not exceed the total number V of levels of the tree data. In this embodiment, illustration will be made using the Cartesian coordinate system x-y-z and the total number $\lambda$ of visible levels of 3, i.e. $\lambda=3$, as an example. Here, all children nodes of the tree data that belong to the same parent node are visualized on the same carousel in the plane x-y, and the multiple levels of the carousels are expanded level by level along the Z-axis. Those skilled in the art will appreciate that the carousel can also be expanded on any plane (such as the plane y-z) of the 3D coordinate system, and the multiple levels of the carousels can be expanded one by one along another axis vertical to this plane. The selection of coordinate systems and different total numbers of visible levels do not constitute limitations on the present invention.

Based on the established 3D coordinate system and according to the obtained tree data, a root-level carousel is generated and set as the current level in step 306 of the flow shown in FIG. 3. In this embodiment, the origin of the plane x-y is used as the center of the root-level carousel, and the radius r of the root-level carousel is calculated according to the following equation:

$$r = A \ln N + B \quad (1)$$

Where A and B are parameters of carousel visualization that are determined according to the concrete situation (such as resolution and so on) of the visualization device. In the formula above N is the number of nodes of the root-level carousel, i.e. the number of children nodes of the root in the tree data. For example, in this embodiment, the resolution of the visualization device is 1024×768, and N is 100, so A can be determined as 1024×0.3/ln(100)=66.72, and B can be determined as 1024×0.7=716.80, and the carousel radius is 716.8+66.71=783.51. In this embodiment, 85 percent of the width of the visualization region is determined to be occupied in order to leave enough margins.

Those skilled in the art would appreciate equation (1) is merely one method for calculating the radius r of the root-level carousel. A further embodiment of the present invention can utilize any method in the prior art to generate a carousel.

The visualized root-level carousel is used as a visualization initial level. The visualization initial level is the level visualized at the bottom of the carousel in the visualization region. The number is denoted as $i_0$, a value corresponding to the root-level carousel is 1, and then $i_0=1$ at this point. At the same time, the root-level carousel is used as the current level, and then a value of the number i of the current level is 1 at this point, i.e. i=1.

Next, the flow of FIG. 3 receives the user's selection for a node in step 308. Preferably, the user-selected node is rotated to the middle of the carousel facing the user directly and can be highlighted or converted into a different shape or color. The user can use various user input devices to perform this selection operation, for example, click a certain node on the root-level carousel by a mouse or touch the position of a certain node on the touch screen by a finger. It should be understood that how to select a node by the user does not constitute limitations on the present invention.

According to the selection, a judgment is made in step 310 as to whether the user-selected node is a node at the current level. Since there is only the expanded root-level carousel at the current level at this point, the user can select a node at the root-level carouse, i.e. the current level. Therefore, if the judgment result is "yes" in step 310, the flow of FIG. 3 goes to step 312.

In step 312, a further judgment is made as to whether a sub-carousel corresponding to the selected node can be expanded at the current-level carousel. The detailed description of step 312 will be made in conjunction with FIG. 6.

If it is determined through the judgment in step 312 that the sub-carousel of the selected node cannot be expanded at the current-level carousel, the flow of FIG. 3 goes to step 314 in which a sub-carousel corresponding to the selected node is generated at the upper level to the current level and is set as the current level. The detailed description of step 314 will be made in conjunction with FIG. 7. Following step 314, the flow of FIG. 3 returns to step 308.

On the other hand, if it is determined through the judgment in step 312 that the sub-carousel corresponding to the selected node can be expanded at the current-level carousel, the flow of FIG. 3 goes to step 316 in which the sub-carousel corresponding to the selected node is generated at the current-level carousel. The detailed description of step 316 will be made in conjunction with FIG. 9. Following step 316, the flow of FIG. 3 returns to step 308.

When the upper-level sub-carousel is generated in step 314, the user's selection of a node at the root-level carousel or the upper-level sub-carousel might be received in step 308. If the user-selected node is a not node at the current-level carousel, i.e. the selected node is not a node at the expanded sub-carousel but a node at the root-level carousel in this embodiment, the flow of FIG. 3 will determine as "No" in step 310 and goes to step 318. In step 318, the carousel at which the selected node is located and its lower-level carousel (the root-level carousel only in this embodiment) are kept, while other carousels are collapsed. Additionally, the carousel at which the current selected node is located (the root-level carousel at this point) is set as the current level in step 320. At this point, the selected node is used as a focus. Then, the flow of FIG. 3 goes to step 312 and executes each of the aforesaid steps following step 312.

With the flow of FIG. 3, a sub-carousel corresponding to a node the user has selected can be expanded in co-level manner or visualized level by level, so that a focus becomes more prominent and the context of the focus gets more apparent.

To clearly illustrate the method of FIG. 3, how to generate multi-level carousels of tree data by means of the method will be further explained in conjunction with FIGS. 4a-4d. Corresponding to step 302 of FIG. 3, the tree data shown in FIG. 4a is obtained. It can be seen that except the root node, the entire tree data comprises multiple levels, wherein children nodes of the root node include node 1, node 2, node 3, etc. As a parent node, node 1's children nodes include node 1.1, node 1.2, etc. And children nodes of node 1.2 include node 1.2.1, node 1.2.2, and node 1.2.3.

The 3D coordinate system x-y-z is established in the visualization region just as shown in FIG. 4a in step 304, and the root-level carousel is generated in step 306. When the user's selection of a node at the root-level carousel is received, for example, the user selects node 1, based on the judgment made in steps 310 and 312 of FIG. 3, a sub-carousel corresponding to node 1 is expanded at the upper level of the root-level carousel, i.e. the higher level along the positive direction of the Z-axis, and node 1 is highlighted as a focus, just as shown in FIG. 4c. Returning to step 308, node 1.2 is then selected by the user and a third-level carousel corresponding to node 1.2 is expanded based the judgment made in step 310 and 312 of FIG. 3. In respect of the user's selection of node 1.2.1, node 1.2.2, and node 1.2.3 at the third-level carousel, based on the judgment made in steps 310 and 312, respective sub-carousels corresponding to node 1.2.1, node 1.2.2, and node 1.2.3 are expanded in co-level manner at the third-level carousel, just as shown in FIG. 4d. In FIG. 4d, the third level visualized on top is the current level, this level carousel and the three sub-carousel expanded in co-level manner form a focus, and carousels at two lower levels of the current level, namely the second-level carousel and the root-level carousel, form the context of the focus to provide information such as level relationship of the focus.

Each of FIGS. 4a-4d describes the situation in which the sub-carousel is expanded at the upper level or the current level when the user selects a node at the current level. Here after, the processing in the case similar to the multi-level carousel visualization shown in FIG. 4d and when the user selects a node not at the current level will be illustrated in conjunction with FIGS. 5a-5b. The operation corresponds to operations of steps 318 and 320 of the flow shown in FIG. 3.

FIG. 5a shows an example of tree data of three-level carousel visualization. The third level is used as the current-level carousel with two sub-carousels expanded in co-level manner, where the user's selection of node 2 at the root-level carousel is received in step 308 of FIG. 3, since this selected node is not at the current level. In this embodiment, step 310 will be determined as "No", and only the carousel at which the selected node is located and its lower-level carousel are kept according to the judgment made in step 318 of FIG. 3. With respect to the multi-level carousels shown in FIG. 5a, the root-level carousel at which node 2 is located is kept only and set as a new current-level carousel, while the original second-level and third-level (the original current level) carousels and sub-carousels expanded therein are collapsed. Subsequently, based on the judgment made in step 312 of FIG. 3, the second-level carousel corresponding to node 2 is expanded at the upper level of the root-level carousel. This is also shown in FIG. 5b.

Whether the current level is the original current level or the current level newly set in step 320, for a selected node at the current level, the flow of FIG. 3 will go to step 312 for a judgment as to whether a sub-carousel corresponding to the selected node can be expanded at the current level. Hereinafter, the detailed operation for the judgment will be described in conjunction with the flowchart of FIG. 6.

Figure 6:
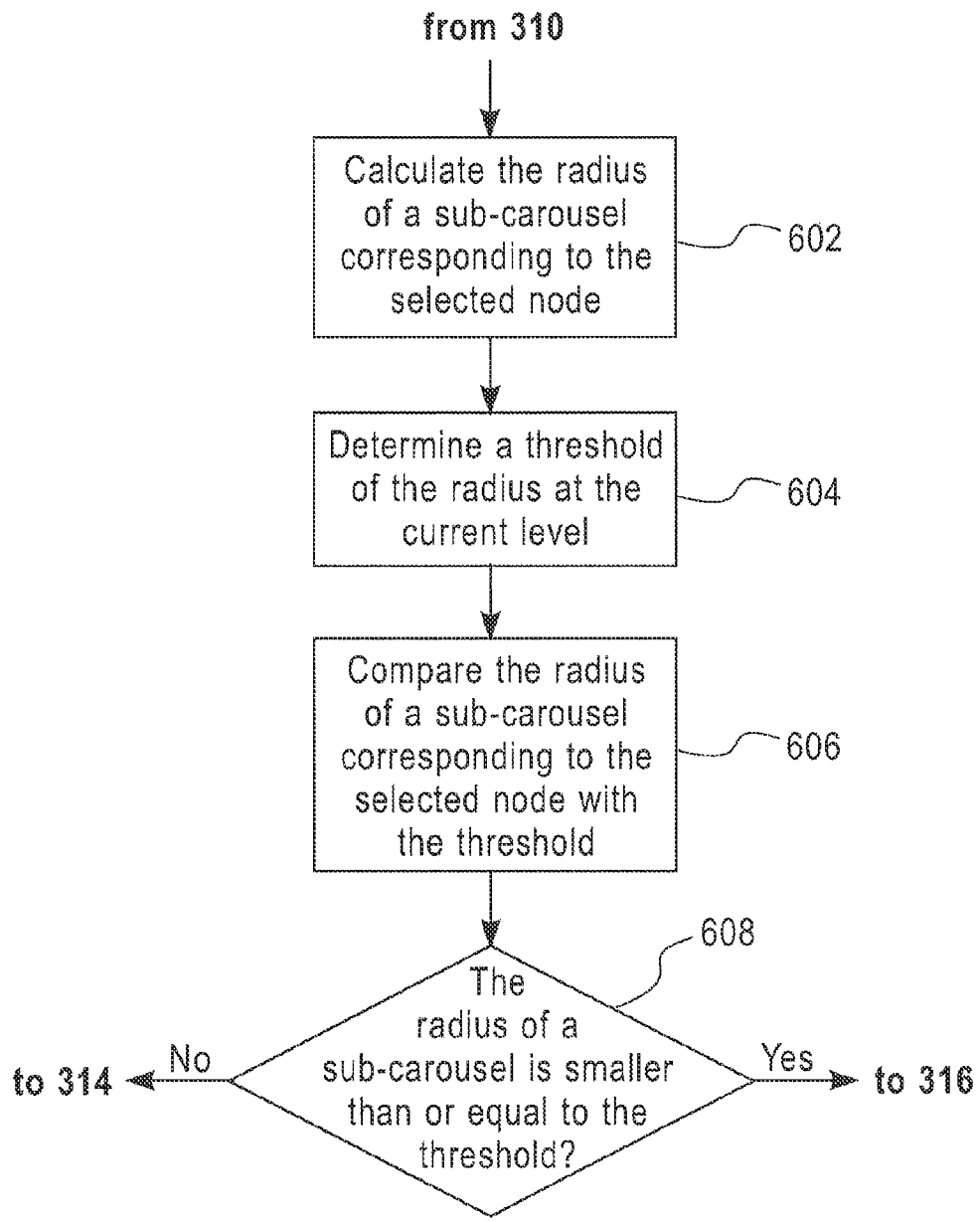
FIG. 6 shows a detailed flow of a judgment as to whether a sub-carousel corresponding to a selected node can be expanded at the current level, which is made in the flow of the method shown in FIG. 3.

First, the flow of FIG. 6 starts. In step 602, the radius $r_n$ of a sub-carousel corresponding to the selected node n is calculated:

$$r_n = A' \ln N_n + B' \quad (2)$$

Wherein A' and B' are parameters of carousel visualization as determined according to the concrete situation (such as resolution and so on) of the visualization device; $N_n$ is the number of children nodes which the selected node n as a parent node has. Those skilled in the art should understand that equation (2) is merely one method of calculating the radius $r_n$ of a sub-carousel corresponding to a selected node. Embodiments of the present invention can utilize any method in the prior art for calculating the radius of a carousel.

Next, the threshold R of the radius of a sub-carousel generated in co-level manner, namely the maximum value for the radius of a sub-carousel expanded in co-level manner at the current-level carousel is determined in step 604. This threshold can be preset, for example, as ¼ of the radius of the current-level carousel. Any appropriate threshold can be set in light of a user's needs.

In step 606, the obtained radius $r_n$ of the sub-carousel corresponding to the selected node is compared with the threshold R of the radius of the sub-carousel generated leveling co-level. If it is judged in step 608 that the radius $r_n$ of the sub-carousel corresponding to the selected node is smaller than or equal to the threshold R of the radius of the sub-carousel generated in co-level manner, the flow of FIG. 6 goes to step 316 of FIG. 3, otherwise goes to step 314 of FIG. 3.

Hereinafter, the detailed operation of step 314 of FIG. 3 will be described in conjunction with FIG. 7.

Figure 7:
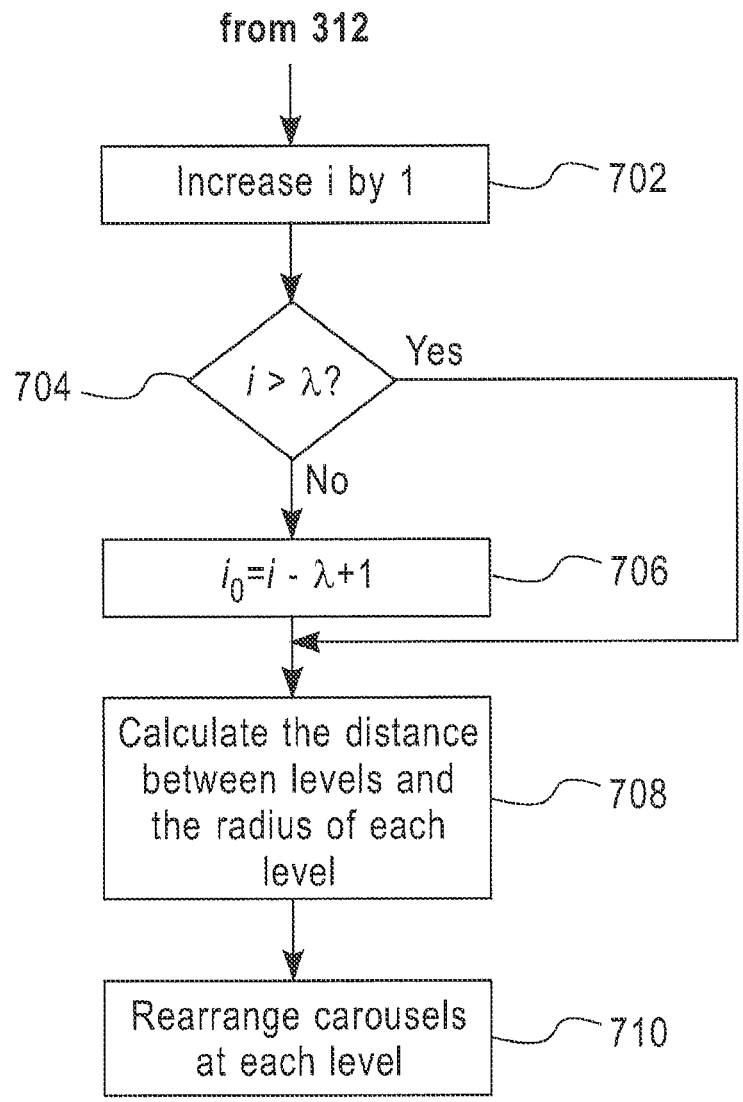
FIG. 7 shows a detailed flow of generating at the upper level to the current level a sub-carousel corresponding to a selected node in the flow of the method shown in FIG. 3.

First, the flow of FIG. 7 starts. In step 702, the upper level to the current level is set as a new current level. At this point, the number i of the current level is increased by 1. Then, it is judged in step 704 whether the number i of the current level is larger than the total number λ of the visible levels. If it is judged that the number i of the current level is larger than the total number λ of the visible levels, the number $i_0$ of the initial level of visualization is revised to be equal to i−λ+1, so that a maximum of λ levels of carousels can be visualized in the visualization region of the visualization device. As a result, it is ensured that the method of generating tree data visualization of this embodiment enables to clearly visualize a focus and the context most related to the focus.

In step 708, the distance between carousels at respective levels and the radius of a carousel at each level are calculated. In this embodiment, the calculation is performed using the following equation:

$$g_i = \mu \cdot H_{\max} \cdot (i/V)^2 \quad i = 1, 2, 3 \ldots n \ldots \quad (3)$$

$$r = \begin{cases} g_i/\tan(\alpha) + r_{i-1} & i_0 < i < i_0 + \lambda \\ r_{\min} & i = i_0 \\ 0 & i < i_0 \end{cases}$$

wherein i denotes the number of level of a carousel to be generated; $g_i$ denotes the distance between carousels at respective levels; p is a constant for controlling the increment step of $g_i$; $H_{max}$ denotes the maximum height of the visualization region, which determines the maximum number of levels of carousels to be visualized in the visualization region; $\lambda$ denotes the maximum number of levels of carousels to be visualized in the visualization region; V denotes the total number of levels of carousels current visualized in the visualization region, which is smaller than the maximum number $\lambda$ of levels of carousels to be visualized in the visualization region; $r_i$ denotes the radius of a carousel at the $i^{th}$ level; $i_0$ denotes the level at which a carousel visualized at the bottom in the visualization region is located; $r_{min}$ denotes the radius of the bottom carousel in the visualization region, and the tangent of $\alpha$ is a ratio of the distance between carousels at two levels to the difference of radiuses of the carousels at two levels. These parameters can be specified in view of users' actual needs.

Equation (3) is merely an example of generating carousel visualization tree data using a conic prototype and along the Z-axis of the 3D coordinate system. Those skilled in the art can appreciate that other prototype can be employed to construct carousel visualization of tree data, such as a prototype of revolution body of conic, so long as the radius of a higher-level carousel is larger than the radius of a lower-level carousel. Such setting is advantageous to collapse some low-level carousels. For example, the radius of a low-level carousel that is relatively far away from the focus is set as 0 so that carousels at higher levels can occupy larger visualization space. Preferably, to enhance the utility of the visualization region, the distance between higher level carousels can be set as larger than the distance between lower level carousels so as to visualize the focus prominently and clearly show the context related to the focus. In another embodiment, even a prototype of cylinder in which the radius of higher level carousels is equal to that radius of lower level carousels can be employed for the case in which there is an enough distance between carousel levels. Therefore, selections of different prototypes used for constructing carousel visualization of tree data do not constitute limitations on the present invention.

Based on the distance between carousels at respective levels and the radius of a carousel at each level as calculated according to equation (3), the layout of a carousel at each level in the visualization region is rearranged in step 710 of the flow shown in FIG. 7, so that the relationship between carousels at respective levels can be shown clearly. Then, the flow shown in FIG. 7 ends.

Figure 8:
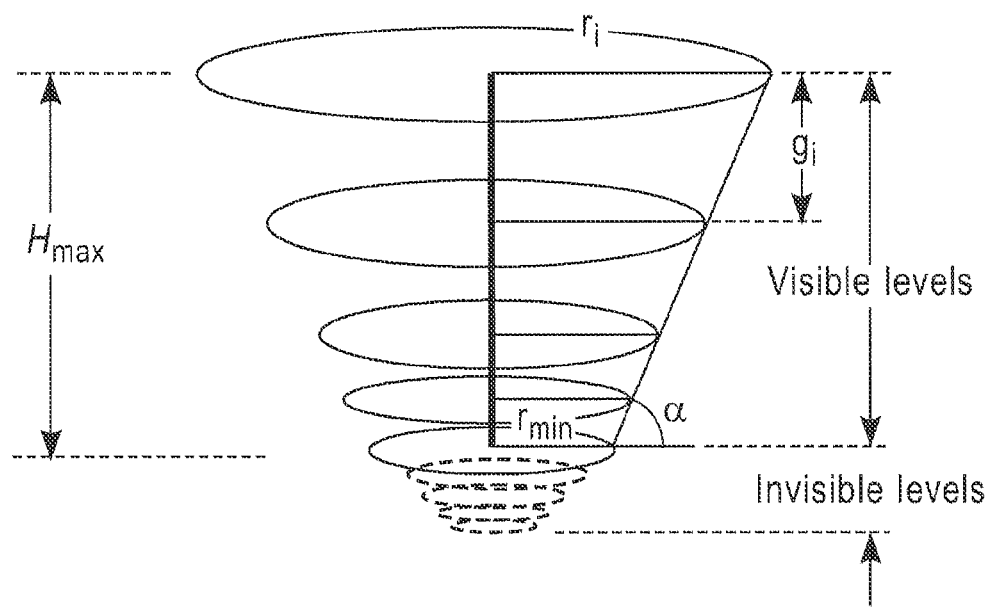
FIG. 8 shows a schematic view of relationships between respective parameters in an equation for calculating gaps between carousels at respective levels and the radius of a carousel at each level according to an embodiment of the present invention.

FIG. 8 shows a view of an example of the relationship between parameters in equation (3), wherein the denotation of each parameter is illustrated by referring to FIG. 7. As shown in FIG. 8, carousels marked by solid line are carousels visualized in the visualization region with the bottom level being the initial visualization level. Carousels marked in dashed line are carousels that are not visualized in the visualization region. A scroll bar can be provided in the method of generating tree data visualization according to an embodiment of the present invention, and carousels visualized in the visualization region and the context thereof can be changed by dragging this scroll bar. For example, in this embodiment, relatively high levels will be visualized in the visualization region by scrolling up the scroll bar while relatively low levels in the tree data will not be visualized. On the contrary, relatively low levels will be visualized in the visualization region by scrolling down the scroll bar while relatively high levels in the tree data will not be visualized. Also, different levels of carousels visualized in the visualization region and the context thereof can be changed by clicking carousels one by one, setting a clicked carousel as the highest level of the visualization region, and visualizing a carousel at its lower level as context. Additionally, different levels of carousels visualized in the visualization region and the context thereof can be changed by panning operations, setting a central carousel as the highest level carousel, and visualizing the carousel at its lower level as context.

In this embodiment, the maximum height $H_{max}$ of the visualization region of the visualization device can receive a maximum of $\lambda$ carousel levels. For a visualization region whose resolution is 1024×768, an example of these parameters, the distance between carousels at respective levels and the radius of a carousel at each level calculated according to equation (3) is shown as the table below:

| resolution | $H_{max}$ | $\lambda$ | $\mu$ | $r_{min}$ | $V \leq \lambda$ | $g_i$ | $r_i$ |
|---|---|---|---|---|---|---|---|
| 1024 * 768 | 768 * 80% = 614.4 | 4 | 1 | 300 | 2 | $g_2 = H_{max}(1/2)^2$ | $r_2 = g_2/\tan(\alpha) + 300$ |
| | | | | | 3 | $g_3 = H_{max}(2/3)^2$ | $r_3 = g_3/\tan(\alpha) + r_2$ |
| | | | | | | $g_2 = H_{max}(1/3)^2$ | $r_2 = g_2/\tan(\alpha) + 300$ |
| | | | | | 4 | $g_4 = H_{max}(3/4)^2$ | $r_4 = g_4/\tan(\alpha) + r_3$ |
| | | | | | | $g_3 = H_{max}(2/4)^2$ | $r_3 = g_3/\tan(\alpha) + r_2$ |
| | | | | | | $g_2 = H_{max}(1/4)^2$ | $r_2 = g_2/\tan(\alpha) + 300$ |

In this example, the maximum height for visualizing carousels in the visualization region is specified as 80% of the height of the visualization region, i.e. $H_{max}$=614.4, $\lambda$ is specified as 4, $\mu$ is 1, and $r_{min}$ is 300. The distance between and radius of carousels when the current-level carousel is at the second level, the third level, and the fourth level is calculated according to equation (3). $\alpha$ is calculated according to the equation $\alpha$=arctan($H_{max}/(r_{max}-r_{min})$), where $r_{max}$ is the obtained radius r of the root-level carousel through the calculation according to equation (1), i.e. $r_{max}$=783.51. As a result, $\alpha$=arctan(614.4/(783.51−300))=51.80.

Figure 9:
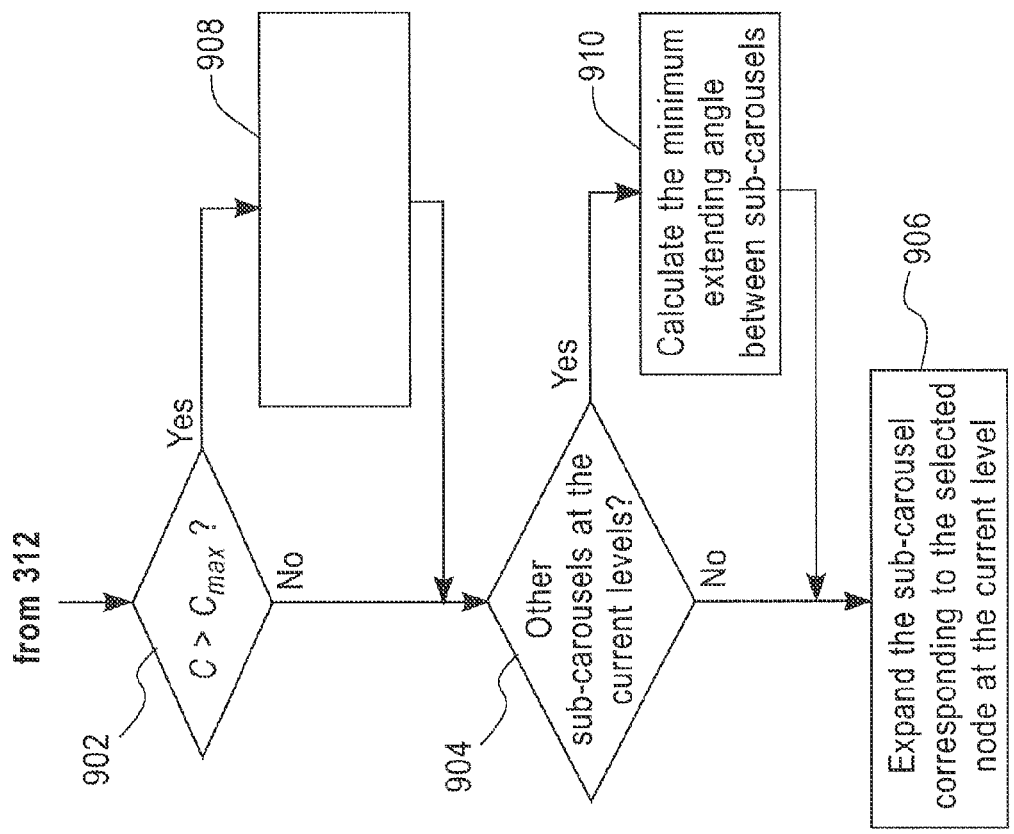
FIG. 9 shows a detailed flow of expanding a sub-carousel in the current level of carousels in the flow of the method shown in FIG. 3.

FIG. 9 shows a detailed flow of step 316 in FIG. 3 to illustrate how a sub-carousel is expanded at the current-level carousel. After the flow shown in FIG. 9 starts, a judgment is made in step 902 as to whether the number C of expanded sub-carousels in the current-level carousel is larger than or equal to the maximum number $C_{max}$ of expanded sub-carousels allowed at this level. The maximum number $C_{max}$ of expanded sub-carousels allowed at the current level can be set according to the concrete situation of the visualization region of the visualization device or to users' needs, for example 2 or 3. If it is determined through the judgment that the number C of expanded sub-carousels in the current-level carousel is smaller than the maximum number $C_{max}$ of expanded sub-carousels allowed at this level, it means that more sub-carousels can be expanded directly at the current level. At this point, the flow goes to step 904 in which a further judgment is made as to whether there are other sub-carousels at the current level. If it is determined through the judgment that there is no other sub-carousel, the flow shown in FIG. 9 goes to step 906. In step 906, a sub-carousel corresponding to a selected node is expanded directly at the current level. The radius of the sub-carousel can be calculated according to equation (1), and the center can be the original position of the selected node.

If it is determined through the judgment that the number C of expanded sub-carousels in the current-level carousel is larger than or equal to the maximum number $C_{max}$ of expanded sub-carousels allowed at this level, it means that the number of currently expanded sub-carousels has reached the maximum. Therefore, the flow shown in FIG. 9 goes to step 908 in which at least one currently expanded sub-carousel is collapsed. Preferably, the innermost sub-carousel and/or the earliest expanded sub-carousel are collapsed. Since the user-selected node will be rotated to a position in the middle of the carousel directly facing the user and visualized as a focus, to collapse the innermost sub-carousel is to collapse a sub-carousel corresponding to the node that is farthest away from the current focus. Following step 908, the flow shown in FIG. 9 returns to step 904.

If it is determined through the judgment in step 904 that there are other sub-carousels at the current level, the flow shown in FIG. 9 goes to step 910. In step 910, the minimum extending angle γ between respective sub-carousels is calculated. That is to say, the extending angle between respective sub-carousels should be larger than or equal to this minimum extending angle γ:

$$\gamma = \arcsin(r_{i1}/r_i) + \arcsin(r_{i2}/r_i) \quad (4)$$

wherein $r_{i1}$ denotes the radius of the first sub-carousel, $r_{i2}$ denotes the radius of the second sub-carousel, and $r_i$ denotes the radius of the current-level carousel. According to the minimum extending angle γ, the flow returns to step 906 for operation. Then, the flow shown in FIG. 9 ends.

Figure 10:
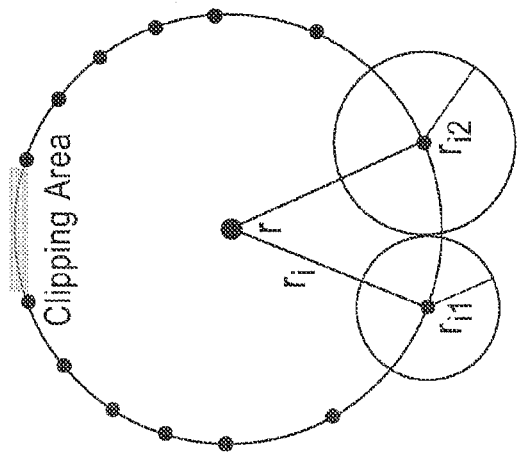
FIG. 10 shows a schematic view of calculating the minimum extending angle γ in the flow shown in FIG. 9.

For the minimum extending angle γ, reference can be made to the schematic view of FIG. 10. In FIG. 10, the circle whose radius is denoted by $r_i$ is the current-level carousel, and solid dots distributed along its circumference denote nodes at the current-level carrousel. Like data visualized in carousel in the prior art, the clipping area of the carousel omits other nodes that are not shown. Circles whose respective radiuses are denoted by $r_{i1}$ and $r_{i2}$ are two sub-carousels expanded at the current level, and the minimum extending angle γ between them is calculated using equation (4).

Figure 11A:
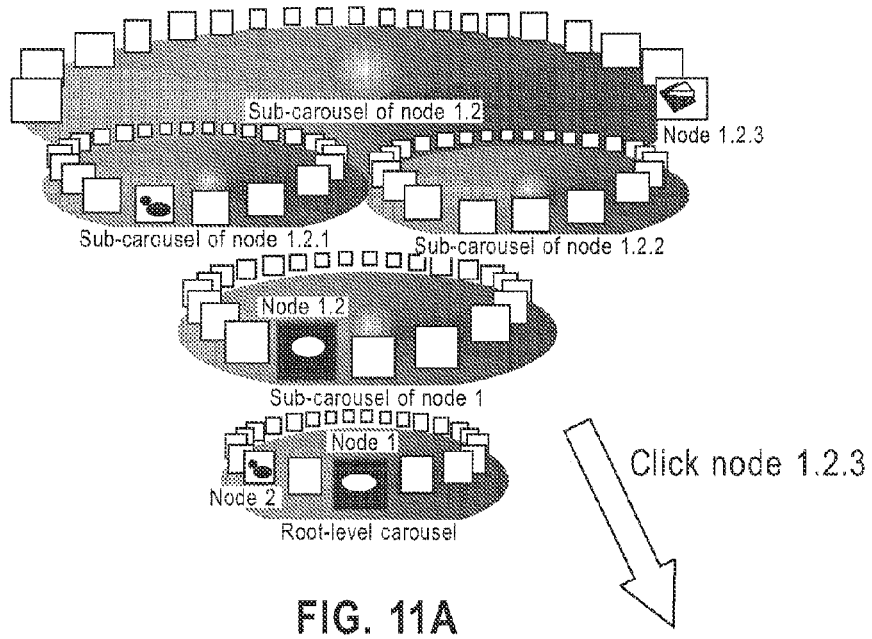
FIG. 11a show a schematic view of an operation performed when the number of expanded sub-carousels is larger than or equal to the maximum number of expanded sub-carousels allowed at this level.
Figure 11B:
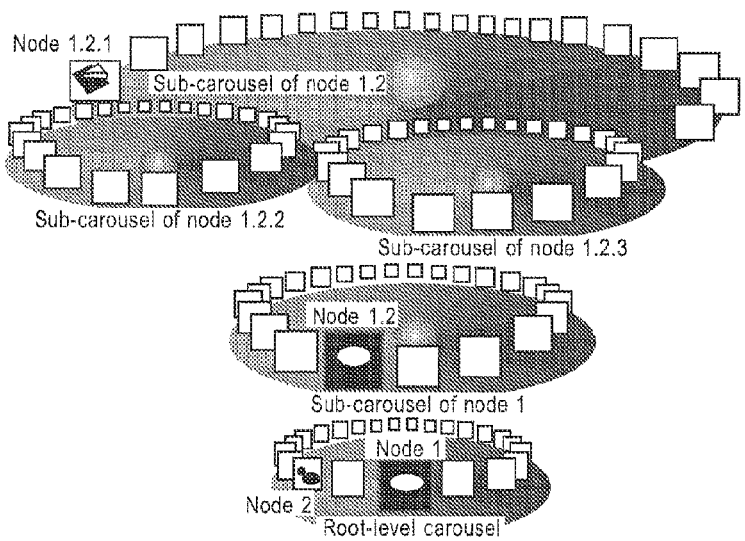
FIG. 11b show a schematic view of an operation performed when the number of expanded sub-carousels is larger than or equal to the maximum number of expanded sub-carousels allowed at this level.

To further illustrate the operation of step 908 in FIG. 9, each of FIGS. 11a-11b shows a schematic view of operation performed when the number C of expanded sub-carousels is larger than or equal to the maximum number $C_{max}$ of expanded sub-carousels allowed at this level. In this embodiment, illustration is made with the maximum number $C_{max}$ of expanded sub-carousels allowed at this level equaling 2. In the case of the multi-level carousels shown in FIG. 11a, upon receipt of the user's selection of node 1.2.3, preferably a sub-carousel corresponding to the innermost sub-carousel for node 1.2.3, namely a sub-carousel corresponding to node 1.2.1, is collapsed in step 908 of FIG. 9, just as shown in FIG. 11b.

From the above description, the method for generating tree data visualization according to an embodiment of the present invention has been illustrated in detail, and tree data visualized in carousel can be generated sequentially on the basis of the tree data. As the total number λ of visible levels can be set at any time according to needs. The number of levels of the carousels visualized in the visualization region of the visualization device can be adjusted dynamically, thereby making the visualization of a focus more prominent and relationships between nodes at a carousel at each level visualized in the tree data clearer. In particular, when there is a large amount of tree data, superposition of nodes can be avoided effectively and problems in the previous references can be solved by reducing the total number λ of visible levels.

To implement the method for generating tree data visualization according to an embodiment of the present invention, the present invention further provides a related device.

Figure 12:
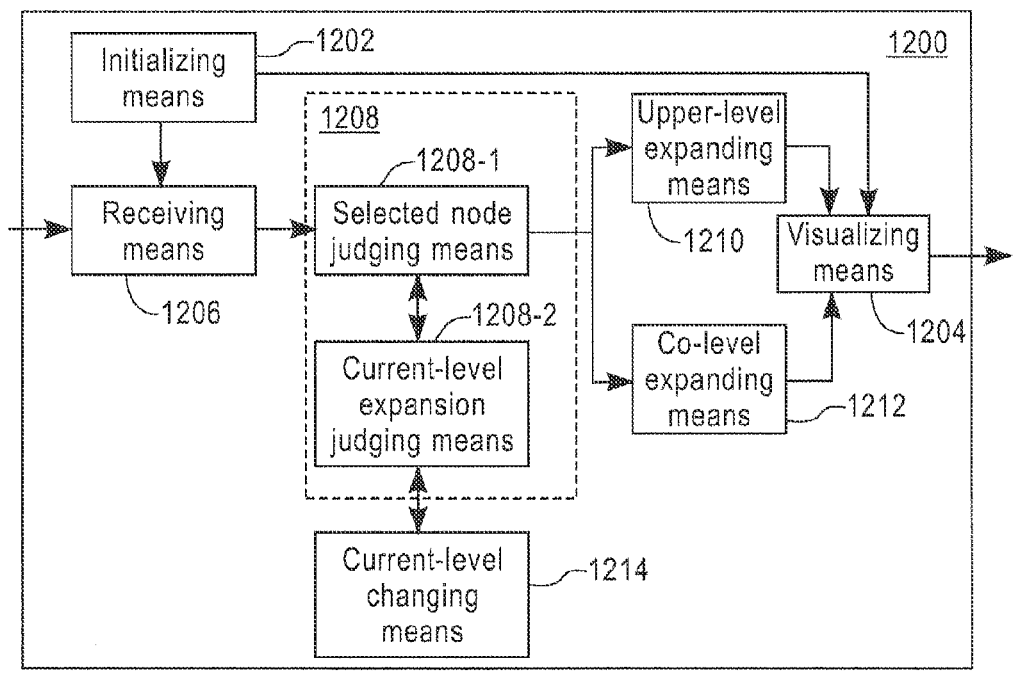
FIG. 12 shows a structure block diagram of a device for generating tree data visualization according to an embodiment of the present invention.

FIG. 12 shows a structure block diagram of a device 1200 for generating tree data visualization according to an embodiment of the present invention. The device comprises an initializing means 1202, a visualizing means 1204, receiving means 1206, a judging means 1208, a upper-level expanding means 1210, a co-level expanding means 1212,—and a current-level changing means 1214, wherein the judging means 1208 comprises a selected node judgment means 1208-1 and a current-level expansion judging means 1208-2.

Initializing means 1202 obtains tree data to be visualized. The tree data may be generated by device 1200 generating tree data visualization received from an other device (not shown) coupled to device 1200 generating tree data visualization.

Initializing means 1202 establishes a 3D coordinate system in a visualization region and sets the total number λ of visible levels in the visualization region according to the concrete situation of visualizing means 1204 for visualizing tree data.

It should be understood that various methods for establishing a 3D coordinate system in the prior art can be employed, and all kinds of 3D coordinate system (including different orientation setting of the coordinate system) can be adopted as long as carousels receiving nodes at each level can be visualized in the 3D visual form. Also, users can set the total number λ of visible levels out of different consideration.

Based on the created 3D coordinate system, The initializing means 1202 generates a root-level carousel according to the obtained tree data, sets the root-level carousel as a current level, and feeds it to visualizing means 1204 to be visualized and output.

Receiving means 1206 is for receiving a user's selection of a node and highlighting the node. It should be understood that how the user selects a node does not constitute limitations on the present invention.

According to the selection, selected node judging means 1208-1 in judging means 1208 makes a judgment as to whether the user-selected node is a node at the current level. If it is determined through the judgment that the user-selected node is a node at the current level, current level expansion judging means 1208-2 makes a further judgment as to whether a sub-carousel corresponding to the selected node can be expanded at the current-level carousel.

If current level expansion judging means 1208-2 determines that the sub-carousel corresponding to the selected node cannot be expanded within the current-level carousel, then upper level expanding means 1210 generates a sub-carousel corresponding to the selected node at the upper level of the current level and sets the sub-carousel as the current level. The multi-level carousels, which are generated by upper level expanding means 1210 level by level, will be fed to visualizing means 1204 for visualization. A detailed structure of upper level expanding means 1210 will be illustrated in conjunction with FIG. 14.

Alternatively if the current level expansion judging means 1208-2 determines that a sub-carousel corresponding to the selected node can be expanded within the current-level carousel, the co-level expanding means 1212 generates a sub-carousel corresponding to the selected node within the current-level carousel. Multiple carousels expanded in co-level manner by co-level expanding means 1212 will be fed into visualizing means 1204 for visualization. A detailed structure of co-level expanding means 1212 will be illustrated in conjunction with FIG. 15.

After upper the level expanding means 1210 generates an upper-level sub-carousel, receiving means 1206 might receive the user's selection of a node within the root-level carousel or the upper-level sub-carousel. When selected node judging means 1208-1 determines that the user-selected node is not a node within the current-level carousel, i.e. the selected node is not a node within an expanded sub-carousel but a node within the root-level carousel in this embodiment, current level changing means 1214 will perform relevant processing. Current level changing means 1214 merely keeps a carousel at which the selected node is located and a lower-level carousel—merely the root-level carousel in this embodiment. The current level changing means collapses other carousels, sets the carousel at which the selected node is located as the current level, and takes the selected node as a focus. Afterwards, for the changed current level which is used as a new current level, the current level expansion judgment means 1208-2 makes a judgment as described above. The other means performs subsequent operation, thereby generating tree data visualization.

Figure 13:
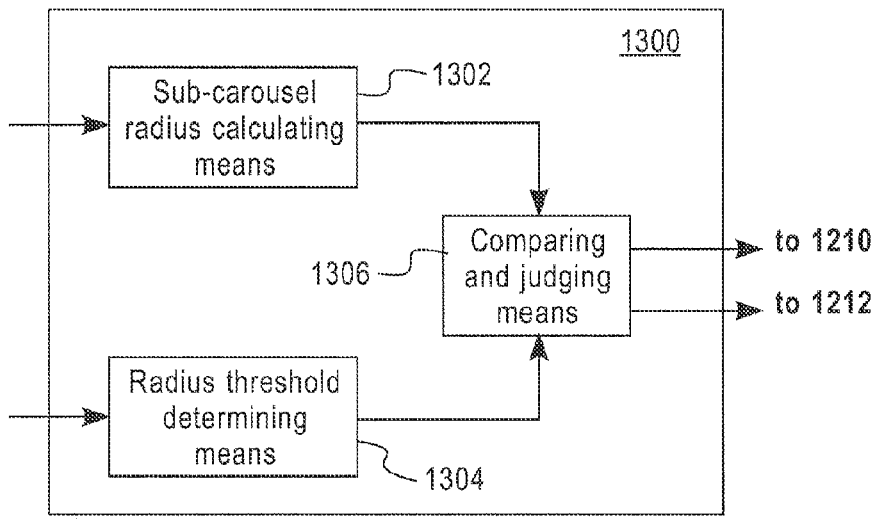
FIG. 13 shows an internal structure block diagram of current level expanding judgment means in the device for generating tree data visualization shown in FIG. 12.

An internal structure of current level expansion judgment means 1208-2 in device 1200 generating tree data visualization is as shown in FIG. 13. In this figure, current level expansion judging means 1208-2 comprises sub-carousel radius calculating means 1302, radius threshold determining means 1304, and comparison judging means 1306.

Sub-carousel radius calculating means 1302 calculates the radius $r_n$ of a sub-carousel corresponding to a selected node n.

Radius threshold determining means 1304 determines a threshold R of the radius of a carousel generated in co-level manner, i.e. the maximum radius value of a carousel expanded in co-level manner within a current-level carousel.

In comparison judging means 1306, the obtained radius $r_n$ of a sub-carousel corresponding to the selected node is compared with the threshold R of the radius of a sub-carousel generated in co-level manner. If the radius $r_n$ of a sub-carousel corresponding to the selected node is determined to be larger than the threshold R of the radius of a sub-carousel generated in co-level manner at the current level, the tree data is fed to upper level expanding means 1210 shown in FIG. 12 for performing the above operation of generating a sub-carousel, corresponding to the selected node at the upper level of the current level. The sub-carousel level is set as the current level. Otherwise, co-level expanding means 1212 performs the operation of generating a sub-carousel corresponding to the selected node within the current-level carousel.

Figure 14:
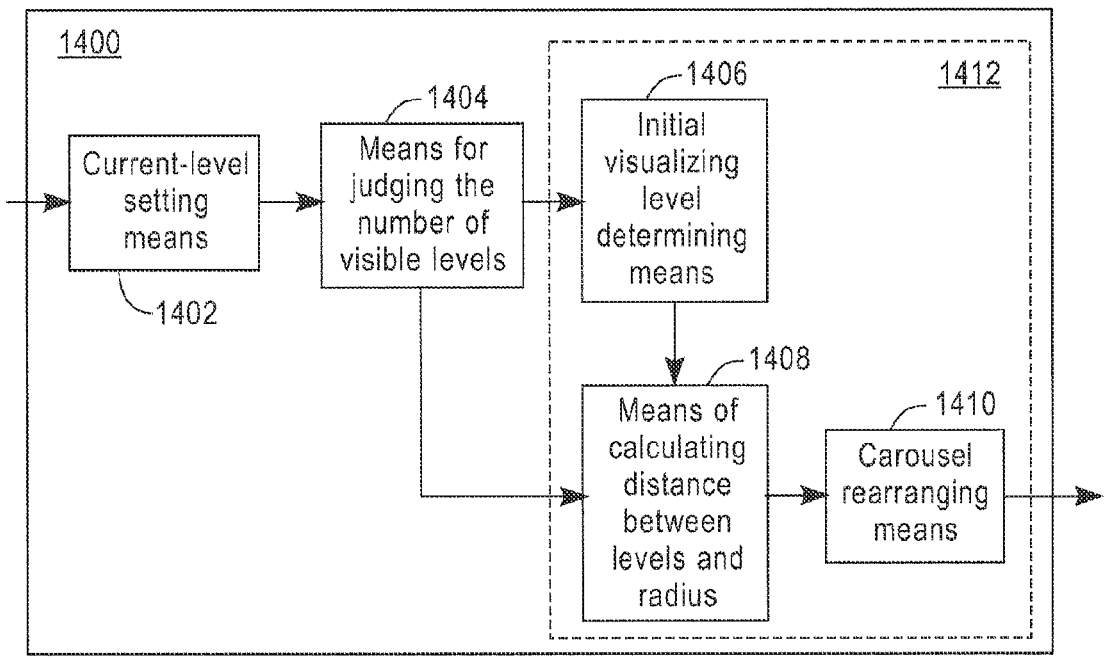
FIG. 14 shows an internal structure block diagram of upper level expanding means in the device for generating tree data visualization shown in FIG. 12.

The inner structure of upper level expanding means 1210 in FIG. 12 will be further illustrated in conjunction with FIG. 14. Upper level expanding means 1210 shown in FIG. 14 comprises a current level setting means 1402, a means 1404 for judging the number of visible levels, a initial visualization level determining means 1406, a means 1408 for calculating the distance between levels and the radius of a carousel, and a carousel rearranging means 1410, The initial visualization level determining means 1406, the means 1408 for calculating the distance between levels and the radius of a carousel, and the carousel rearranging means 1410 are called carousel visualizing means 1412 as a whole.

Current level setting means 1402 sets the upper level of a current level as a new current level. At this point, the number of the current level is increased by 1. The means 1404 for judging the number of visible levels makes a judgment as to whether the number i of a current level is larger than the total number $\lambda$ of visible levels. If the number i of a current level is determined to be larger than the total number $\lambda$ of visible levels, the initial visualization level determining means 1406 revises the number $i_0$ of a initial visualization level to make it equal to $i-\lambda+1$. This is so that a maximum of $\lambda$ levels of carousels is visualized in the visualization region of visualizing means 1204 in FIG. 12. Thus, it is ensured that device 1200 generating tree data visualization in this embodiment can highlight a focus and clearly show the context thereof.

Following the above, means 1408 for calculating the distance between levels and the radius of a carousel, calculates the distance between carousels at respective levels and the radius of a carousel at each level. According to the distance between a carousel at respective levels and the radius of a carousel at each level (calculated by means 1408 for calculating the distance between levels and the radius of a carousel) the carousel rearranging means 1410 rearranges the layout of carousels at respective levels in the visualization region and feeds the multi-level carousels that clearly visualize the relationship between carousels at respective levels to visualizing means 1204 for visualization.

Figure 15:
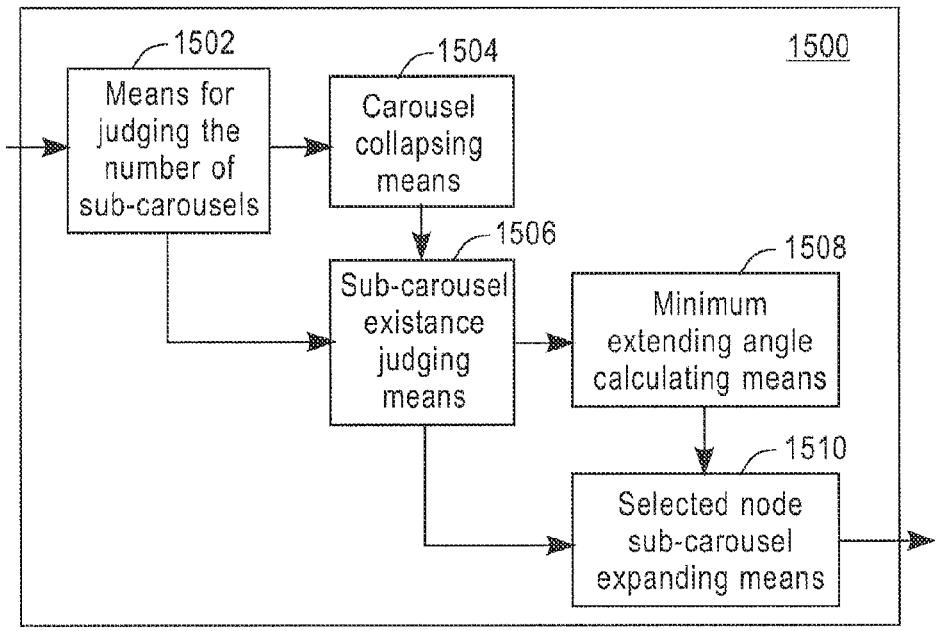
FIG. 15 shows an internal structure block diagram of co-level expanding means in the device for generating tree data visualization of FIG. 12.

Alternatively the co-level expanding means 1212, whose internal structure is as shown in FIG. 15, generates a sub-carousel corresponding to the selected node within the current-level carousel. Co-level expanding means 1212 comprises means 1502 for judging the number of sub-carousels, carousel collapsing means 1504, sub-carousel existence judging means 1506, minimum extending angle calculating means 1508, and selected-node sub-carousel expanding means 1510.

Means 1502 for judging the number of sub-carousels makes a judgment as to whether the number C of expanded sub-carousels in the current-level carousel is larger than or equal to the maximum number $C_{max}$ of expanded sub-carousels allowed at this level. If it is determined through the judgment that the number C of expanded sub-carousels in the current-level carousel is smaller than the maximum number $C_{max}$ of expanded sub-carousels allowed at this level, more sub-carousels can be expanded directly at the current level. At this point, sub-carousel existence judging means 1506 makes a further judgment as to whether there are other sub-carousels at the current level. If it is determined through the judgment that there is no other sub-carousel, selected node sub-carousel expanding means 1510 expands a sub-carousel corresponding to the selected node at the current level directly.

If means 1502 for judging the number of sub-carousels determines that the number C of expanded sub-carousels in the current-level carousel is larger than or equal to the maximum number $C_{max}$ of expanded sub-carousels allowed at this level, it means that the number of currently expanded sub-carousels has reached the maximum. Therefore, carousel collapsing means 1504 collapses at least one currently expanded sub-carousel. Next, sub-carousel existence judging means 1506 performs further judgment and operations and particularly performs the above-described operations when there is no other sub-carousel at the current level.

If sub-carousel existence judging means 1506 determines that there are other sub-carousels at the current level, minimum extending angle calculating means 1508 calculates the minimum extending angle $\gamma$ between respective sub-carousels. According to the minimum extending angle $\gamma$, selected node sub-carousel expanding means 1510 expands a sub-carousel corresponding to the selected node at the current level.

The method for generating 3D carousel tree data visualization according to an embodiment of the present invention can be implemented in a computer system in a centralized or distributed manner. Any type of computer system or other device suitable to the implementation of the method described here is suitable to perform functions described here.

FIG. 16 schematically shows a computer device in which the embodiments according to the present invention can be implemented. The computer system shown in FIG. 16 comprises a CPU (Central Processing Unit) 1601, RAM (Random Access Memory) 1602, ROM (Read Only Memory) 1603, a system bus 1604, a Hard Disk (HD) controller 1605, a keyboard controller 1606, a serial interface controller 1607, a parallel interface controller 1608, a display controller 1609, a hard disk 1610, a keyboard 1611, a serial external device 1612, a parallel external device 1613 and a display 1614. Among these components, connected to system bus 1604 are CPU 1601, RAM 1602, ROM 1603, HD controller 1605, keyboard controller 1606, serial interface controller 1607, parallel interface controller 1608 and display controller 1609. Hard disk 1610 is connected to HD controller 1605, and keyboard 1611 to keyboard controller 1606, serial external device 1612 to serial interface controller 1607, parallel external device 1613 to parallel interface controller 1608, and display 1614 to display controller 1609.

The functions of each component in FIG. 16 are well known in the art, and the architecture shown in FIG. 16 is conventional. Such architecture applies to not only personal computers but also hand held devices such as Palm PCs, PDAs (personal data assistants), mobile telephones, etc. In different applications, some components shown in FIG. 16 may be omitted. The whole system shown in FIG. 16 is controlled by computer readable instructions, which are usually stored as software in hard disk 1610, EPROM or other non-volatile memory. The software can also be downloaded from the network (not depicted in the figure). The software, either saved in hard disk 1610 or downloaded from the network, can be loaded into RAM 1602, and executed by CPU 1601 for implementing the functions defined by the software.

As the computer system depicted in FIG. 16 is able to support the method for generating 3D carousel tree data visualization according to the present invention, the computer system merely serves as an example of computer systems. Those skilled in the art may understand that many other computer system designs are also able to carry out the embodiments of the present invention.

The present invention may further be implemented as a computer program product used by, for example the computer system shown in FIG. 16, which contains code for implementing the method for generating 3D carousel tree data visualization according to the present invention. The code may be stored in a memory of other computer system prior to the usage. For instance, the code may be stored in a hard disk or a removable memory like an optical disk or a floppy disk, or may be downloaded via the Internet or other computer network.

The disclosed method of the present invention may be implemented in software, hardware or a combination thereof. The hardware part may be implemented using a dedicated logic, and the software part may be stored in a memory and be implemented by a proper instruction implementing system, such as a microprocessor, a personal computer (PC) or a mainframe.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

We claim:

1. A method for generating a 3D carousel tree data visualization, the 3D carousel tree data visualization tree data being visualized in the form of multiple levels of 3D carousels, the method comprising the steps of:
   receiving a user's selection of a node in the 3D carousel;
   setting the carousel in which the user-selected node is located to the carousel of the current level when the carousel in which the user-selected node is located is not the carousel of the current level, and otherwise proceeding when the carousel in which the user-selected node is located is the carousel of the current level;
   judging according to a radius of a sub-carousel corresponding to the user-selected node and the radius of the current level carousel at which the selected node is located, whether or not the sub-carousel can be expanded at the current level carousel at which the user-selected node is located;
   expanding the sub-carousel at the current level carousel at which the user-selected node is located, when said judging judges that said sub-carousel of said user-selected node can be expanded at the current level carousel at which the user-selected node is located; and
   generating a sub-carousel corresponding to said user-selected node at a level higher than the current level carousel being viewed when said judging judges that said sub-carousel of said user-selected node cannot be expanded at said current level carousel.

2. The method according to claim 1, wherein the radius of the sub-carousel corresponding to the user-selected node depends on at least one of: a visualization device for visualizing the 3D carousel tree data, and a number of children nodes the user-selected node as a parent node has.

3. The method according to claim 2, wherein the radius of the sub-carousel corresponding to the user-selected node is calculated using the following equation:

$$r = A \ln N + B$$

wherein r is the radius of the sub-carousel corresponding to the user-selected node, A and B are parameters of a visualization region visualizing the multiple levels of 3D carousels, and N is a number of children nodes the user-selected node as a parent node has.

4. The method according to claim 3, wherein said judging is performed according to the radius of the sub-carousel corresponding to the user-selected node and the radius of the current level carousel at which the selected node is located, so as to perform the step of expanding the sub-carousel at the current level carousel in which the user-selected node is located when said judging judges that the radius of the sub-carousel corresponding to the user-selected node is smaller than a threshold, and to perform the step of generating the sub-carousel corresponding to said user-selected node at a level higher than the current level carousel being viewed when said judging judges that the radius of the sub-carousel corresponding to the user-selected node is not smaller than the threshold.

5. The method according to claim 4, wherein a threshold related to the radius of the carousel at which the selected node is located is ¼ of the radius of the carousel at which the selected node is located.

6. The method according to claim 1, wherein the expanding of the sub-carousel at the carousel at which the selected node is located comprises the steps of:

judging whether or not a number of expanded sub-carousels at the carousel at which the selected node is located is equal to or exceeds an allowable limit of expanded sub-carousels provided for a particular level of the carousel;

and when said judging of whether the number is equal to or exceeds the allowable limit judges that the number is in fact equal to or exceeds the allowable limit, expanding the sub-carousel corresponding to the user-selected node at the carousel at which the selected node is located after collapsing at least one expanded sub-carousel at the carousel at which the selected node is located, and otherwise expanding directly the sub-carousel corresponding to the user-selected node at the carousel at which the selected node is located.

7. The method according to claim 6, wherein the step of expanding the sub-carousel corresponding to the user-selected node at the carousel at which the selected node is located further comprises the steps of:

judging whether or not there are other sub-carousels at the carousel at which the selected node is located;

if said judging of whether or not there are other sub-carousels judges that there are other sub-carousels at the carousel at which the selected node is located:
  calculating the minimum extending angle between respective sub-carousels and
  arranging, according to the minimum extending angle, the sub-carousel corresponding to the user-selected node at the carousel at which the selected node is located, and otherwise, if said judging of whether or not there are other sub-carousels judges that there are not other sub-carousels at the carousel at which the selected node is located, skipping said calculating and arranging.

8. A method for generating a 3D carousel tree data visualization, the 3D carousel tree data visualization tree data being visualized in the form of multiple levels of 3D carousels, the method comprising the steps of:

receiving a user's selection of a node in the 3D carousel;

judging according to a radius of a sub-carousel corresponding to the user-selected node and the radius of a carousel at which the selected node is located, whether or not the sub-carousel can be expanded at the carousel at which the user-selected node is located;

expanding the sub-carousel at the carousel at which the user-selected node is located, when said judging judges that the sub-carousel can be expanded at the carousel at which the user-selected node is located;

wherein the expanding of the sub-carousel at the carousel at which the selected node is located further comprises:

judging whether or not a number of expanded sub-carousels at the carousel at which the selected node is located is larger than or equal to a maximum number of expanded sub-carousels allowed at the carousel;

when said judging of whether said number of expanded sub-carousels is larger than or equal to said maximum number judges that said number is larger than or equal to said maximum number, expanding the sub-carousel corresponding to the user-selected node at the carousel at which the selected node is located after collapsing at least one expanded sub-carousel at the carousel at which the selected node is located;

judging whether or not there are other sub-carousels at the carousel at which the selected node is located; and if said judging of whether or not there are other sub-carousels at the carousel judges that that there are other sub-carousels at the carousel at which the selected node is located, performing the steps of:

(i) calculating the minimum extending angle between respective sub-carousels; and (ii) arranging, according to the minimum extending angle, the sub-carousel corresponding to the user-selected node at the carousel at which the selected node is located, wherein the minimum extending angle between respective sub-carousels is calculated according to the equation comprising: the minimum extending angle=$\arcsin(r_{i1}/r_i)+\arcsin(r_{i2}/r_i)$, and wherein, $r_{i1}$ denotes the radius of a first sub-carousel, $r_{i2}$ denotes the radius of a second sub-carousel: and $r_i$ denotes the radius of the carousel at which the selected node is selected, otherwise, if said judging of whether there are other sub-carousels at the carousel does not judge that that there are other sub-carousels at the carousel at which the selected node is located, skipping said steps (i) and (ii).

9. A method for generating 3D carousel tree data visualization, the 3D tree data being visualized in the form of multiple levels of 3D carousels, the method comprising the steps of:

setting a total number of visible levels, which is a maximum number of carousel levels that can be visualized in a region where the multiple levels of the 3D carousels are visualized;

receiving a user's selection of a node in the carousels;

keeping a carousel at which the node is located and a lower-level carousel thereof, and collapsing other carousels;

expanding a sub-carousel corresponding to the user-selected node where a top-level carousel is the carousel in which the sub-carousel is expanded and the total number of the visualized carousels does not exceed the total number of the visible levels, wherein the step of expanding the sub-carousel corresponding to the user-selected node where a top-level carousel is the carousel in which the sub-carousel is expanded and the total number of the visualized carousels does not exceed the total number of the visible levels further comprises:

judging, according to the radius of the sub-carousel corresponding to the user-selected node and the radius of the carousel at which the selected node is located, whether or not the sub-carousel can be expanded at the carousel at which the selected node is located;

expanding the sub-carousel at the carousel at which the selected node is located if said judging of whether or not the sub-carousel can be expanded at the carousel judges that the sub-carousel can be expanded at the carousel at which the selected node is selected, otherwise, if said judging judges that the sub-carousel cannot be expanded at the carousel at which the selected node is selected, performing:

judging if the number of levels of carousels currently expanded in the region visualizing the multi-levels of the 3D carousels is smaller than the total number of visible levels; and expanding a sub-carousel at an upper level of the carousel at which the selected node is located if said judging of the number of levels of carousels currently expanded in the region judges that the number of levels of currently expanded carousels is smaller than the total number of visible levels, otherwise collapsing a bottom-level carousel in the region visualizing a multi-level of the 3D carousels; and expanding the sub-carousel at the upper level of the carousel at which the selected node is located; if said judging of the number of levels of carousels currently expanded in the region judges that the number of levels of currently expanded carousels is not smaller than the total number of visible levels.

10. The method according to claim 9, further comprising: navigating each level of the carousels and visualizing a carousel level appearing in a region visualizing the multiple levels of the 3D carousels through the navigating operation.

11. A device for generating the 3D carousel tree data visualization, for visualizing tree data in the form of multiple levels of the 3D carousels, the device comprising:
   a processor; and
   instructions executable by the processor to perform a method, the method comprising the steps of:
   receiving a user's selection of a node in the 3D carousel;
   setting the carousel in which the user-selected node is located to the carousel of the current level when the carousel in which the user-selected node is located is not the carousel of the current level, and otherwise proceeding when the carousel in which the user-selected node is located is the carousel of the current level;
   judging according to a radius of a sub-carousel corresponding to the user-selected node and the radius of the current level carousel at which the selected node is located, whether or not the sub-carousel can be expanded at the current level carousel at which the user-selected node is located;
   expanding the sub-carousel at the current level carousel at which the user-selected node is located, when said judging judges that said sub-carousel of said user-selected node can be expanded at the current level carousel at which the user-selected node is located; and
   generating a sub-carousel corresponding to said user-selected node at a level higher than the current level carousel being viewed when said judging judges that said sub-carousel of said user-selected node cannot be expanded at said current level carousel.

12. The device according to claim 11, wherein the radius of the sub-carousel corresponding to the user-selected node depends on at least one of: a visualization device for visualizing the 3D carousel tree data, and a number of children nodes the user-selected node as a parent node has.

13. The device according to claim 12, wherein the radius of the sub-carousel corresponding to the user-selected node is calculated using the following equation:

$$r = A \ln N + B$$

wherein, r is the radius of the sub-carousel corresponding to the user-selected node, A and B are parameters of a visualization region visualizing the multiple levels of 3D carousels, and N is a number of children nodes the user-selected node as a parent node has.

14. The device according to claim 13, wherein said judging is performed according to the radius of the sub-carousel corresponding to the user-selected node and the radius of the current level carousel at which the selected node is located, so as to perform the step of expanding the sub-carousel at the current level carousel in which the user-selected node is located when said judging judges that the radius of the sub-carousel corresponding to the user-selected node is smaller than a threshold, and to perform the step of generating the sub-carousel corresponding to said user-selected node at a level higher than the current level carousel being viewed when said judging judges that the radius of the sub-carousel corresponding to the user-selected node is not smaller than the threshold.

15. The device according to claim 14, wherein a threshold related to the radius of the carousel at which the selected node is located is ¼ of the radius of the carousel at which the selected node is located.

16. The device according to claim 11, wherein the expanding of the sub-carousel at the carousel at which the selected node is located comprises the steps of:
   judging whether or not a number of expanded sub-carousels at the carousel at which the selected node is located is equal to or exceeds an allowable limit of expanded sub-carousels provided for a particular level of the carousel;
   and when said judging of whether the number is equal to or exceeds the allowable limit judges that the number is in fact equal to or exceeds the allowable limit, expanding the sub-carousel corresponding to the user-selected node at the carousel at which the selected node is located after collapsing at least one expanded sub-carousel at the carousel at which the selected node is located,
   and otherwise expanding directly the sub-carousel corresponding to the user-selected node at the carousel at which the selected node is located.

17. The device according to claim 16, wherein the step of expanding the sub-carousel corresponding to the user-selected node at the carousel at which the selected node is located further comprises the steps of:
   judging whether or not there are other sub-carousels at the carousel at which the selected node is located; and
   if said judging of whether or not there are other sub-carousels judges that there are other sub-carousels at the carousel at which the selected node is located,
      calculating the minimum extending angle between respective sub-carousels and
      arranging according to the minimum extending angle the sub-carousel corresponding to the user-selected node at the carousel at which the selected node is located; and
   otherwise if said judging of whether or not there are other sub-carousels judges that there are not other sub-carousels at the carousel at which the selected node is located, skipping said calculating and arranging.

18. A device for generating the 3D carousel tree data visualization, for visualizing tree data in the form of multiple levels of the 3D carousels, the device comprising:
   a processor; and
   instructions executable by the processor to perform a method, the method comprising the steps of:
   receiving a user's selection of a node in the 3D carousel;
   judging according to a radius of a sub-carousel corresponding to the user-selected node and the radius of a carousel at which the selected node is located, whether or not the sub-carousel can be expanded at the carousel at which the user-selected node is located;
   expanding the sub-carousel at the carousel at which the user-selected node is located when said judging judges that the sub-carousel can be expanded at the carousel at which the user-selected node is located,
   wherein the expanding of the sub-carousel at the carousel at which the selected node is located further comprises:
   judging whether or not a number of expanded sub-carousels at the carousel at which the selected node is located is larger than or equal to a maximum number of expanded sub-carousels allowed at the carousel;

expanding the sub-carousel corresponding to the user-selected node at the carousel at which the selected node is located after collapsing at least one expanded sub-carousel at the carousel at which the selected node is located when said judging of whether said number of expanded sub-carousels judges that said number is larger than or equal to said maximum number: and judging whether or not there are other sub-carousels at the carousel at which the selected node is located and if said judging of whether or not there are other sub-carousels judges that that there are other sub-carousels at the carousel at which the selected node is located, performing the steps of:
(i) calculating the minimum extending angle between respective sub-carousels; and
(ii) arranging, according to the minimum extending angle, the sub-carousel corresponding to the user-selected node at the carousel at which the selected node is located, wherein the minimum extending angle between respective sub-carousels is calculated according to the equation comprising: the minimum extending angle=arcsin($r_{i1}/r_i$)+arcsin($r_{i2}/r_i$) and wherein, $r_{i1}$ denotes the radius of a first sub-carousel, $r_{i2}$ denotes the radius of a second sub-carousel: and $r_i$ denotes the radius of the carousel at which the selected node is selected, otherwise, if said judging does not judge that that there are other sub-carousels at the carousel at which the selected node is located, skipping said steps (i) and (ii).

19. A device for generating the 3D carousel tree data visualization, for visualizing tree data in the form of multiple levels of the 3D carousels, the device comprising:
a processor; and
instructions executable by the processor to perform a method, the method comprising the steps of:
setting a total number of visible levels, which is a maximum number of carousel levels that can be visualized in a region where the multiple levels of the 3D carousels are visualized;
receiving a user's selection of a node in the carousels;
keeping a carousel at which the node is located and a lower-level carousel thereof, and collapsing other carousels;

expanding a sub-carousel corresponding to the user-selected node where a top-level carousel is the carousel in which the sub-carousel is expanded and the total number of the visualized carousels does not exceed the total number of the visible levels, wherein the step of expanding the sub-carousel corresponding to the user-selected node where a top-level carousel is the carousel in which the sub-carousel is expanded and the total number of the visualized carousels does not exceed the total number of the visible levels further comprises:

judging, according to the radius of the sub-carousel corresponding to the user-selected node and the radius of the carousel at which the selected node is located, whether or not the sub-carousel can be expanded at the carousel at which the selected node is located;

expanding the sub-carousel at the carousel at which the selected node is located if said judging of whether or not the sub-carousel can be expanded at the carousel judges that the sub-carousel can be expanded at the carousel at which the selected node is selected, otherwise, if said judging judges that the sub-carousel cannot be expanded at the carousel at which the selected node is selected, performing:
judging if a number of levels of carousels currently expanded in the region visualizing the multi-levels of the 3D carousels is smaller than the total number of visible levels; and
expanding a sub-carousel at an upper level of the carousel at which the selected node is located if said judging of the number of levels of carousels currently expanded in the region judges that the number of levels of currently expanded carousels is smaller than the total number of visible levels,
otherwise, collapsing a bottom-level carousel in the region visualizing a multi-level of the 3D carousels and expanding the sub-carousel at the upper level of the carousel at which the selected node is located if said judging of the number of levels of carousels currently expanded in the region judges that the number of levels of currently expanded carousels is not smaller than the total number of visible levels.

* * * * *